United States Patent
Bosma

(10) Patent No.: US 10,042,820 B2
(45) Date of Patent: Aug. 7, 2018

(54) METHOD FOR CONVERTING OOXML FORMATTED SPREADSHEETS TO HTML FOR WEB PRESENTATION

(71) Applicant: Konica Minolta Laboratory U.S.A., Inc., San Mateo, CA (US)

(72) Inventor: Paul Bosma, Nederland, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 38 days.

(21) Appl. No.: 14/815,586

(22) Filed: Jul. 31, 2015

(65) Prior Publication Data

US 2017/0031872 A1 Feb. 2, 2017

(51) Int. Cl.
| | |
|---|---|
| *G06F 3/00* | (2006.01) |
| *G06F 17/21* | (2006.01) |
| *G06F 17/22* | (2006.01) |
| *G06F 17/24* | (2006.01) |

(52) U.S. Cl.
CPC ........ *G06F 17/212* (2013.01); *G06F 17/2229* (2013.01); *G06F 17/2247* (2013.01); *G06F 17/2264* (2013.01); *G06F 17/245* (2013.01); *G06F 17/246* (2013.01)

(58) Field of Classification Search
CPC .. G06F 17/227; G06F 17/212; G06F 17/2205; G06F 17/2247; G06F 17/2288
See application file for complete search history.

(56) References Cited

U.S. PATENT DOCUMENTS

| | | | | |
|---|---|---|---|---|
| 8,958,662 | B1* | 2/2015 | Grosz | G06T 3/4038 382/118 |
| 9,552,439 | B1* | 1/2017 | Krecichwost | G06F 17/30905 |
| 2010/0202708 | A1* | 8/2010 | Fukaya | H04N 1/41 382/246 |
| 2012/0240023 | A1* | 9/2012 | Ohguro | G06F 17/3089 715/221 |
| 2013/0031471 | A1* | 1/2013 | Xu | G06T 11/00 715/251 |

* cited by examiner

*Primary Examiner* — Kyle Stork
(74) *Attorney, Agent, or Firm* — Osha Liang LLP

(57) ABSTRACT

A method for converting an electronic document (ED) having a first format includes comparing an original width of the ED with a predetermined width and an original length of the ED with a predetermined length; splitting the ED into pieces in a width direction when the original width is greater than the predetermined width, and splitting the ED into pieces in a length direction when the original length is greater than the predetermined length, wherein each piece has a width and length less than or equal to the predetermined width and length; storing information representing geometric relationships of the pieces; converting the pieces from the first format into a second format; outputting the converted pieces as first output EDs; and outputting a second output ED having the second format, wherein the second output ED incorporates the first output EDs according to the information when displayed by a viewer application.

9 Claims, 11 Drawing Sheets

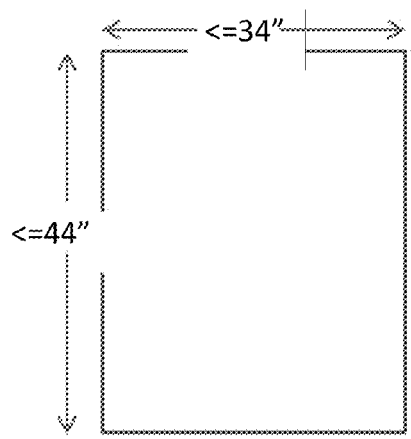
FIG. 4
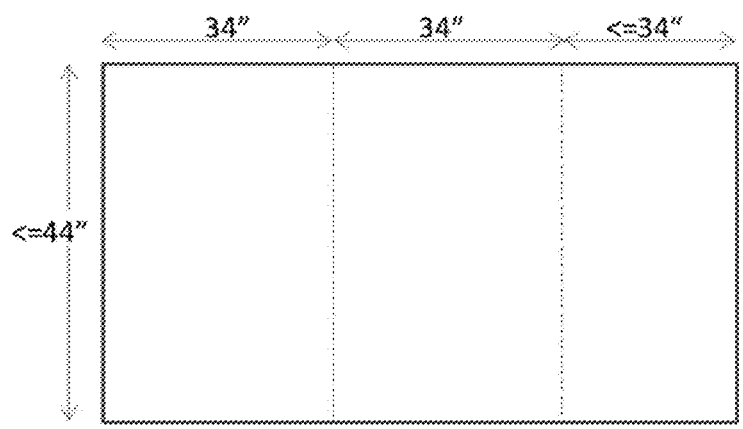
FIG. 6
```
fig B:
    page order: 0
    horz. pages: 3
    vert. pages: 1
  page column   1 - width: 33.7812
  page column   2 - width: 33.7812
  page column   3 - width: 10.76875
     page row   1 - height: 39.16667
```
FIG. 7

```
fig C:
    page order:   0
   horz. pages:   1
   vert. pages:   3
   page column   1 - width:  30.46875
      page row   1 - height: 43.9583
      page row   2 - height: 43.9583
      page row   3 - height: 5.25833
```

```
fig D:
    page order: 0
    horz. pages: 3
    vert. pages: 3
    page column  1 - width: 33.7812
    page column  2 - width: 33.7812
    page column  3 - width: 15.15625
       page row  1 - height: 43.9583
       page row  2 - height: 43.9583
       page row  3 - height: 9.375
```

```xml
<?xml version="1.0" encoding="UTF-8" standalone="no"?>
<?xml-stylesheet href="../css/shared_styles.css" type="text/css"?>
<?xml-stylesheet href="../css/fixed_styles.css" type="text/css"?>
<!DOCTYPE svg PUBLIC "-//W3C//DTD SVG 1.1//EN"
"http://www.w3.org/Graphics/SVG/1.1/DTD/svg11.dtd">
<svg>
...
<title>Large Spreadsheet.xlsx</title>

<!-- Reference to Page Part 1 -->
<svg x="00000" y="00000" width="00000px" height="00000px">
<image x="00000" y="00000" width="00000" height="00000" xlink:href="../images/img_1_1.png"></image>
<g transform = "translate(-000000 -000000)">
<text xml:space="preserve" transform="matrix(0.000328084 0 0 0.000328084 10624.3 1154.07 )" lengthAdjust="spacingAndGlyphs" textLength="000000448717.0000">
<tspan class= "rslt000000011" x="70256" y="268148" textLength="332854" lengthAdjust="spacingAndGlyphs">hex</tspan><tspan class= "rslt000000011" x="403110" y="268148" textLength="115863" lengthAdjust="spacingAndGlyphs">2</tspan></text>
...

</svg>

<!-- Reference to Page Part 2 -->
<defs>
<clipPath id="clip0" >
<path
d=" M 1078.12 2183.37 L 1293.75 2183.37 L 1293.75 2257.25 L 1078.12 2257.25 z "
style="fill:none;stroke:none;"></path>
</clipPath>
</defs>

<g  clip-path="url(#clip0)" >
<text xml:space="preserve" lengthAdjust="spacingAndGlyphs" textLength="000000000125.0000">
<tspan class= "rsflt10000001" x="1094" y="2236" textLength="63" lengthAdjust="spacingAndGlyphs">cell</tspan><tspan class= "rsflt10000001" x="1157" y="2236" textLength="10" lengthAdjust="spacingAndGlyphs"> </tspan><tspan class= "rsflt10000001" x="1167" y="2236" textLength="52" lengthAdjust="spacingAndGlyphs">BA</tspan></text>
</g>
<svg x="00138" y="01052" width="00893px" height="00879px">
<image x="00000" y="00000" width="00893" height="00879" xlink:href="../images/img_2_3.png"></image>

...

</svg>

...
<!-- Worksheet 1 - END -->
</svg>
```

FIG. 14

METHOD FOR CONVERTING OOXML FORMATTED SPREADSHEETS TO HTML FOR WEB PRESENTATION

BACKGROUND

Electronic documents (EDs) are commonly used for storing and disseminating information. Various languages exist to describe the EDs such as Office Open XML (OOXML), OpenDocument Format (ODF), Portable Document Format (PDF), or the like. For example, in an XML-based format like OOXML, a set of markup elements is defined in the ED, and each of the markup elements defines the contents and their position in the ED.

The XML-based format is broadly used for storing various kinds of business documents such as a word processing document, a spreadsheet, a presentation slide, etc. For example, Microsoft Office uses the XML-based format to store a word processing document for Word, a spreadsheet for Excel, and a presentation for PowerPoint.

The XML-based document may also be converted into a format suitable for Web presentation such as HyperText Markup Language (HTML) because both XML and HTML have the markup language structure. Office applications often have a function to convert its XML-based document into an HTML file. Thus, for example, a user can easily publish an OOXML document on the Internet by using such a conversion function in an Office application.

At the same time, various devices such as a server, a PC, a smartphone, a tablet, etc., which are often interconnected via the Internet, can be used by the same or another user to browse the published document. However, the published document is not necessarily optimized to be displayed on the device of the user's choice. Thus, some published documents may not be displayed properly or as intended on some devices. In particular, when a mobile device such as a smart phone is used, the published document containing large tables or graphics (e.g., a spreadsheet) may cause the browser on the device to crash or hang because the CPU (central processing unit) power and memory are insufficient for displaying the document smoothly.

SUMMARY

In general, the invention relates to a method for converting an ED having a certain file format.

In one aspect according to one or more embodiments of the invention, a method for converting an electronic document (ED) having a first file format, comprises: comparing an original width of the ED with a predetermined width and an original length of the ED with a predetermined length; splitting the ED into a plurality of pieces in a width direction when the original width is greater than the predetermined width, and splitting the ED into a plurality of pieces in a length direction when the original length is greater than the predetermined length, wherein each of the pieces has a width and a length less than or equal to the predetermined width and the predetermined length, respectively; storing geometric information representing geometric relationships of the plurality of pieces; converting the plurality of pieces from the first file format into a second file format; outputting the converted pieces having the second file format as first output EDs; and outputting a second output ED having the second file format, wherein the second output ED incorporates the first output EDs in accordance with the geometric information when the second output ED is displayed by a viewer application.

In another aspect according to one or more embodiments of the invention, a conversion system for converting an electronic document (ED) having a first file format, comprises: a memory that stores the ED; and a processor that compares an original width of the ED with a predetermined width and an original length of the ED with a predetermined length; splits the ED into a plurality of pieces in a width direction when the original width is greater than the predetermined width, and splits the ED into a plurality of pieces in a length direction when the original length is greater than the predetermined length, wherein each of the pieces has a width and a length less than or equal to the predetermined width and the predetermined length, respectively; stores geometric information representing geometric relationships of the plurality of pieces; converts the plurality of pieces from the first file format into a second file format; outputs the converted pieces having the second file format as first output EDs to the memory; and outputs a second output ED having the second file format to the memory, wherein the second output ED incorporates the first output EDs in accordance with the geometric information when the second output ED is displayed by a viewer application.

In another aspect according to one or more embodiments of the invention, a non-transitory computer readable medium (CRM) stores instructions for converting an electronic document (ED) having a first format, and the instructions comprises functionality for: comparing an original width of the ED with a predetermined width and an original length of the ED with a predetermined length; splitting the ED into a plurality of pieces in a width direction when the original width is greater than the predetermined width, and splitting the ED into a plurality of pieces in a length direction when the original length is greater than the predetermined length, wherein each of the pieces has a width and a length less than or equal to the predetermined width and the predetermined length, respectively; storing geometric information representing geometric relationships of the plurality of pieces; converting the plurality of pieces from the first file format into a second file format; outputting the converted pieces having the second file format as first output EDs; and outputting a second output ED having the second file format, wherein the second output ED incorporates the first output EDs in accordance with the geometric information when the second output ED is displayed by a viewer application.

Other aspects of the invention will be apparent from the following description and the appended claims.

BRIEF DESCRIPTION OF DRAWINGS

FIG. 4 shows an example of a predetermined width and height in accordance with one or more embodiments of the invention.

FIGS. 5 and 6 each show an example of how to split an input ED in a width direction in accordance with one or more embodiments of the invention.

FIG. 7 shows an example of geometry information in accordance with one or more embodiments of the invention.

FIG. 14 shows an example of an output ED in accordance with one or more embodiments of the invention.

DETAILED DESCRIPTION

Figure 1:
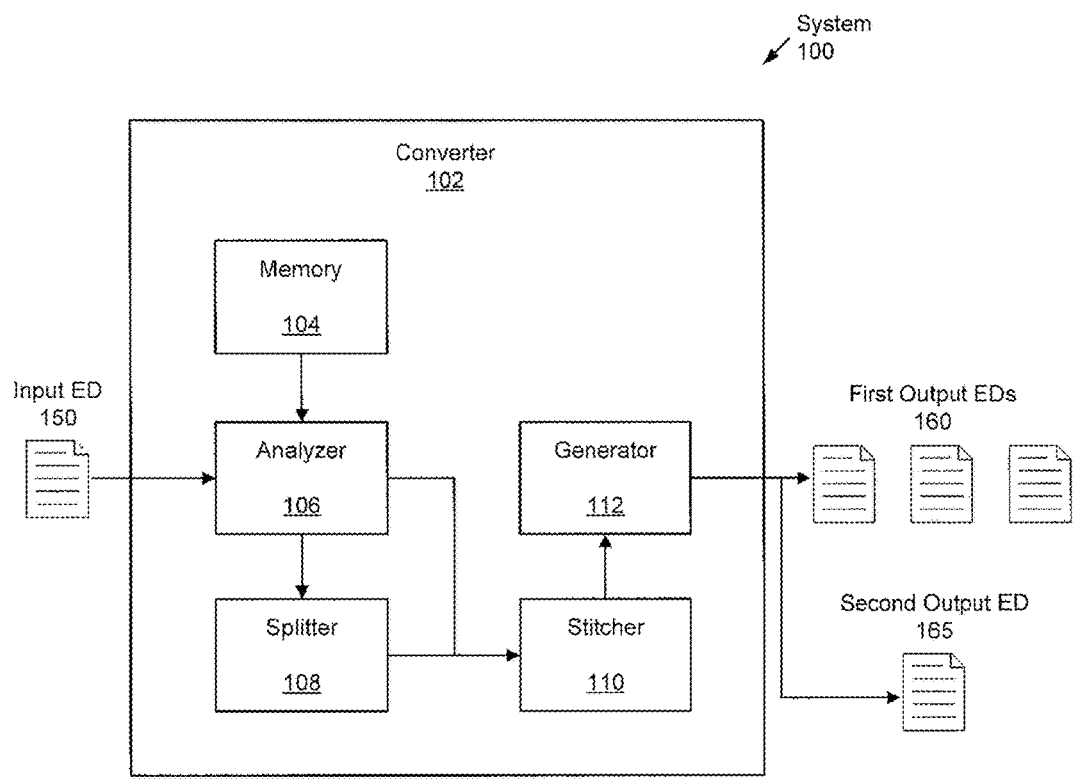
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and a system for converting an ED having one file format (e.g., OOXML) to another ED having a different file format suitable for web presentation (e.g., HTML, Scalable Vector Graphics (SVG), etc.). Examples of the system include, but are not limited to, a server system, a printing system, a document management system, and other computing systems that can create and publish a document on the web. For purposes of illustration only, the descriptions of embodiments herein refer mainly to a computer system that handles a spreadsheet file.

In one or more embodiments of the invention, when the system reads a spreadsheet file having OOXML format specified by a user who desires to convert the file into HTML format, the system may obtain dimensions, i.e., width and height, of the spreadsheet (hereinafter called "original width" and "original height"). For example, the system may obtain the original width and the original height by calculating the width and the height of a minimum size rectangle that contains the cell area and drawable objects on the spreadsheet. The system may calculate the size of the cell area by referring to the spreadsheet XML file that represents column widths and row heights. Further, the system may know the position and the size of the drawing object by referring to the spreadsheet XML file.

Next, the system may compare the original width and the original height with a predetermined width and a predetermined height that have been preset according to a target device that displays the converted spreadsheet. When the original width of the spreadsheet is greater than the predetermined width, or when the original height of the spreadsheet is greater than the predetermined height, the system may split the spreadsheet into several pieces so that each piece of the spreadsheet has a width and a height less than or equal to the predetermined width and the predetermined height. When splitting the spreadsheet, the system may store geometric information representing geometric relationships of the pieces.

In one or more embodiments, the system may convert the pieces from OOXML format into HTML or SVG format, and output "Page" parts corresponding to the pieces of the spreadsheet. The system may further output a "Parent" part based on the stored geometric information that represents a geometric relationship of the Page parts. Thus, when the original spreadsheet exceeds predetermined dimensions (i.e., width and/or height), the system may generate multiple HTML or SVG files containing contents having smaller dimensions. In this way, a device with less computing power and a small memory can display the entire spreadsheet via a viewer application such as an HTML viewer and a web browser without hang-up or crash.

The system in accordance with one or more embodiments may handle various documents other than a spreadsheet, such as a word processing document, a presentation, an image file, an HTML file, and other EDs that can be published on the web. The system may obtain the dimensions, i.e., original width and height/length of the document, and may compare the original width and the original height (length) with a predetermined width and a predetermined height (length) that have been preset according to a target device that displays the converted document.

Turning now to the figures, FIG. 1 shows a system (100) in accordance with one or more embodiments of the invention. As shown in FIG. 1, the system (100) includes a converter (102), and the converter (102) includes a memory (104), an analyzer (106), a splitter (108), a stitcher (110), and a generator (112).

The converter (102) may read or receive from another system or application a spreadsheet as an input ED (150) having OOXML format, and then convert the ED from OOXML to HTML format. The converter (102) may output Page parts as first output EDs (160) corresponding to the split ED and a Parent part as a second output ED (165) that represents the geometric relationship of the Page parts. When dimensions of the input ED (150) are less than or equal to predetermined dimensions, the converter may simply output the converted spreadsheet.

Each of these components (104)-(112) may be located on the same computing device (e.g., a printer, a desktop computer, a server computer, a laptop computer, a tablet, a smart phone, a wearable device, etc.) or may be located on different computing devices connected by a network having wired and/or wireless segments. Further, one or more of these components (104)-(112) may be executed by one or more processors or other dedicated hardware. A storage (not shown) may be provided in the system (100) to store any data that has been processed and/or will be processed by one of the other aforementioned components.

In one or more embodiments of the invention, the memory (104) may store parameters including the predetermined width and the predetermined height used for the ED conversion. In the example shown in FIG. 4, the predetermined width is 34 inches and the predetermined height is 44 inches. Another width and height may be defined as the predetermined width and the predetermined height depending, for example, on CPU power and memory capacity of the target device that will display the converted ED. The memory (104) may temporarily store the input ED (150) and intermediate data generated by the conversion.

In one or more embodiments of the invention, the analyzer (106) may read or receive from another system or application the input ED (150) having OOXML format, and obtain a width and height of the input ED (150) (i.e., original width and original height). Next, the analyzer (106) may compare the original width with the predetermined width, and compare the original height with the predetermined height.

In one or more embodiments of the invention, if the analyzer (106) determines that the original width is less than or equal to the predetermined width and the original height is less than or equal to the predetermined height (i.e., the dimensions of the input ED (150) fit within the predetermined dimensions as shown in FIG. 4), the analyzer (106) may instruct the stitcher (110) to convert the format of the input ED (150) (e.g., from OOXML to HTML). The conversion from OOXML to HTML may be achieved by known methods such as an OOXML-to-HTML.

In one or more embodiments of the invention, if the analyzer (106) determines that the original width is greater than the predetermined width, the analyzer (106) may obtain a scale factor by dividing the predetermined width (e.g., 34 inches) by the original width, and then compare the obtained scale factor with a threshold value (e.g., 0.5). In one or more embodiments of the invention, the analyzer (106) may obtain the scale factor by dividing the predetermined height (e.g., 44 inches) by the original height, and compare the obtained scale factor with a threshold value (e.g., 0.5). When the analyzer (106) determines that the scale factor is greater than or equal to the threshold value, the analyzer (106) may instruct the stitcher (110) to scale the input ED (150) by the scale value, and convert its format. When the analyzer (106) determines that the scale factor is less than the threshold value, the analyzer (106) may instruct the splitter (108) to split the input ED (150) into a plurality of pieces so that each piece has a width and a height less than or equal to the predetermined width and the predetermined height.

In one or more embodiments of the invention, the splitter (108) may split the input ED into a plurality of pieces. As discussed above, each piece has a width and a height less than or equal to the predetermined width and the predetermined height. Referring to the example shown in FIGS. 5 and 6, when the input ED (150) has a width greater than twice the predetermined width (e.g., 68 inches) but less than thrice the predetermined width (e.g., 102 inches), and further has a height less than or equal to the predetermined height (e.g., 44 inches), the splitter (108) may split the input ED (150) into three pieces in the width (horizontal) direction. Furthermore, the splitter (108) may generate geometric information representing the geometric relationships among the three pieces of the input ED (150).

In one or more embodiments of the invention, the splitter (108) may generate text-based geometric information as shown in FIG. 7. As shown in FIG. 7, the geometric information may represent: a page order, the total number of pieces in the width or horizontal direction ("horz. pages"), the total number of pieces in the height or vertical direction ("vert. pages"), the width of each horizontal page ("page columns 1-3"), and the height of each vertical page ("page row"). The splitter (108) may pass such geometric information to the stitcher (110).

Figure 8:
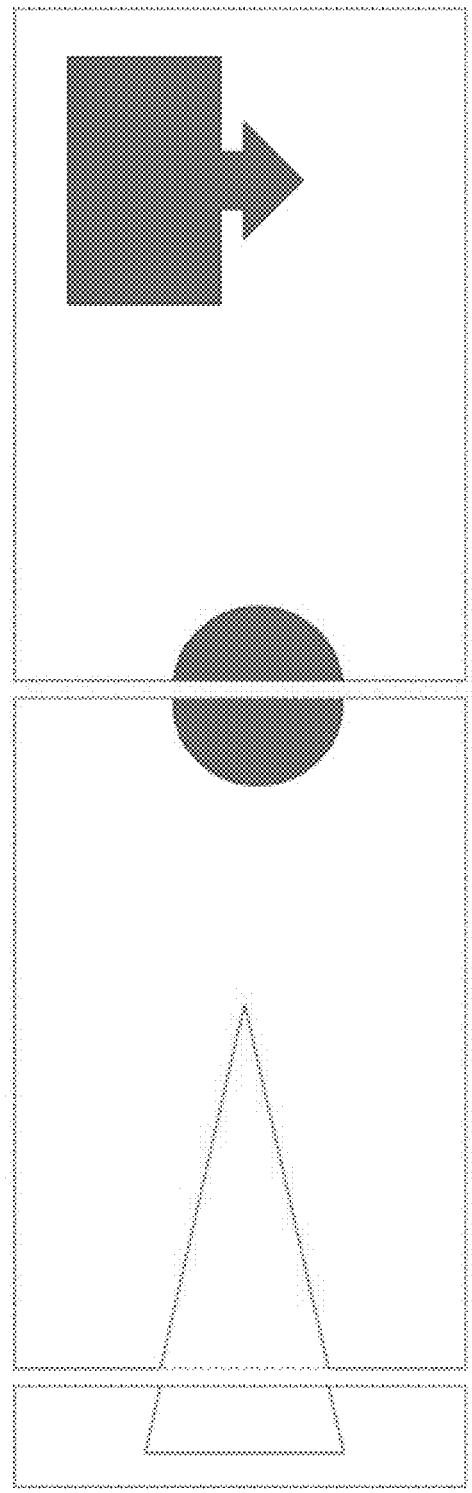
FIGS. 8 and 9 each show an example of how to split an input ED in a height direction in accordance with one or more embodiments of the invention.
Figures 9, 10:
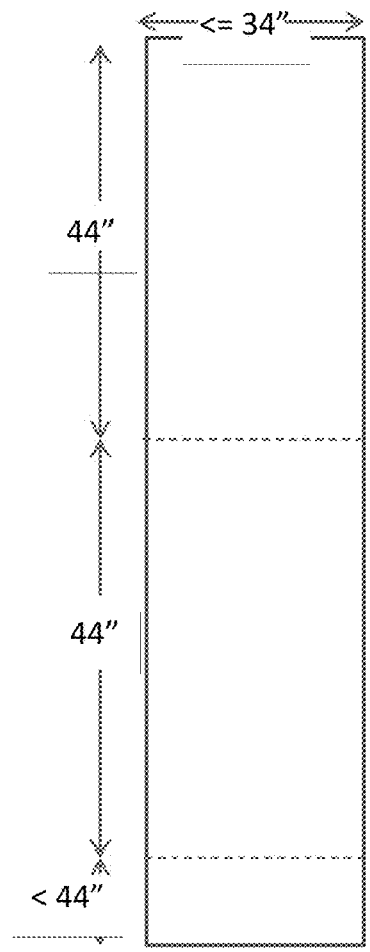
FIG. 10 shows an example of geometry information in accordance with one or more embodiments of the invention.

In one or more embodiments of the invention, as shown in FIGS. 8 and 9, when the input ED (150) has a width less than or equal to the predetermined width (e.g., 34 inches), and a height greater than twice the predetermined height (e.g., 88 inches) but less than or equal to thrice the predetermined height (e.g., 132 inches), the splitter (108) may split the input ED (150) into three pieces in the height (vertical) direction. Furthermore, the splitter (108) may generate geometric information representing the geometric relationships among the three pieces of the input ED as shown in FIG. 10.

Figure 11:
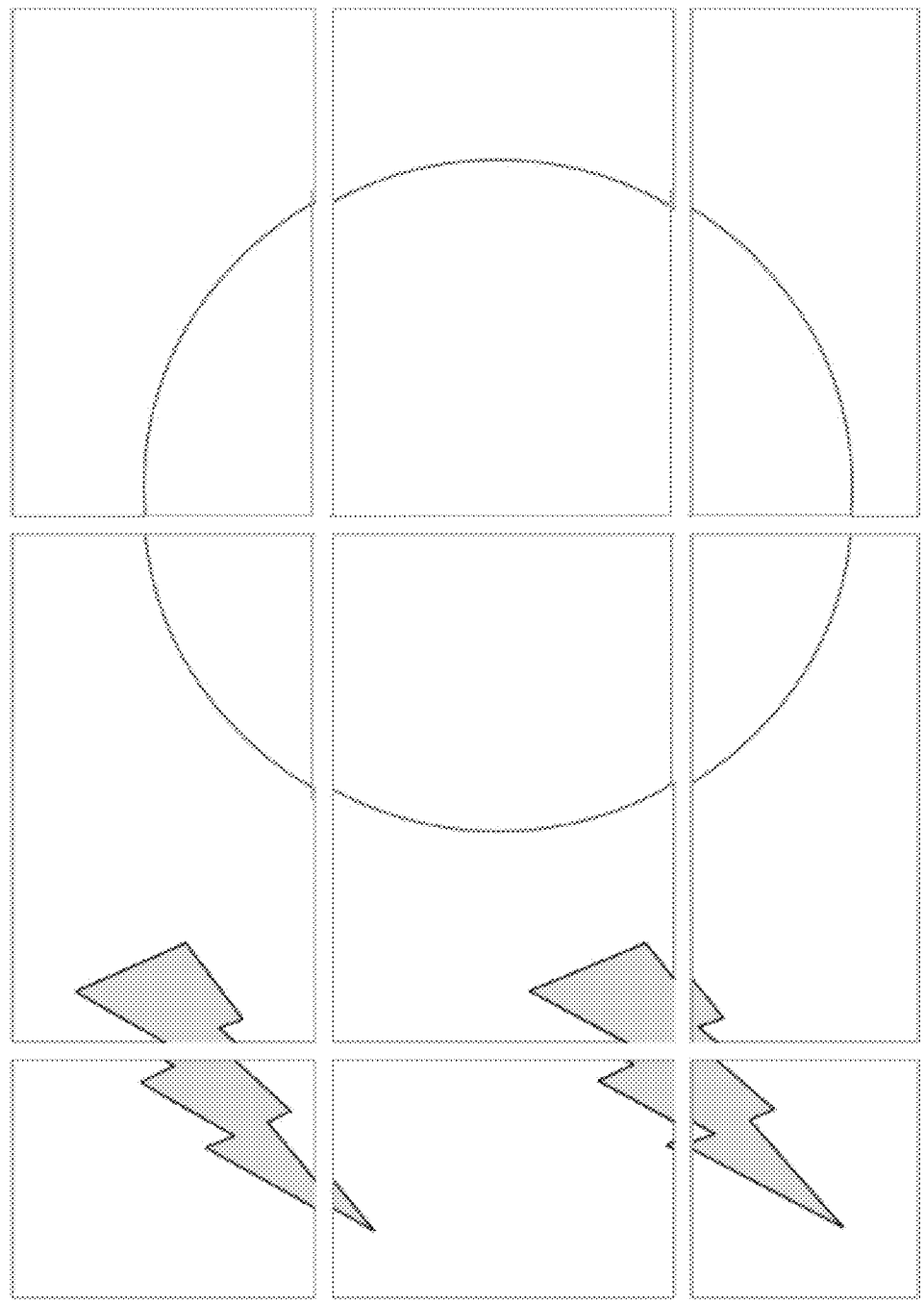
FIGS. 11 and 12 each show an example of how to split an input ED in both width and height directions in accordance with one or more embodiments of the invention.
Figures 12, 13:
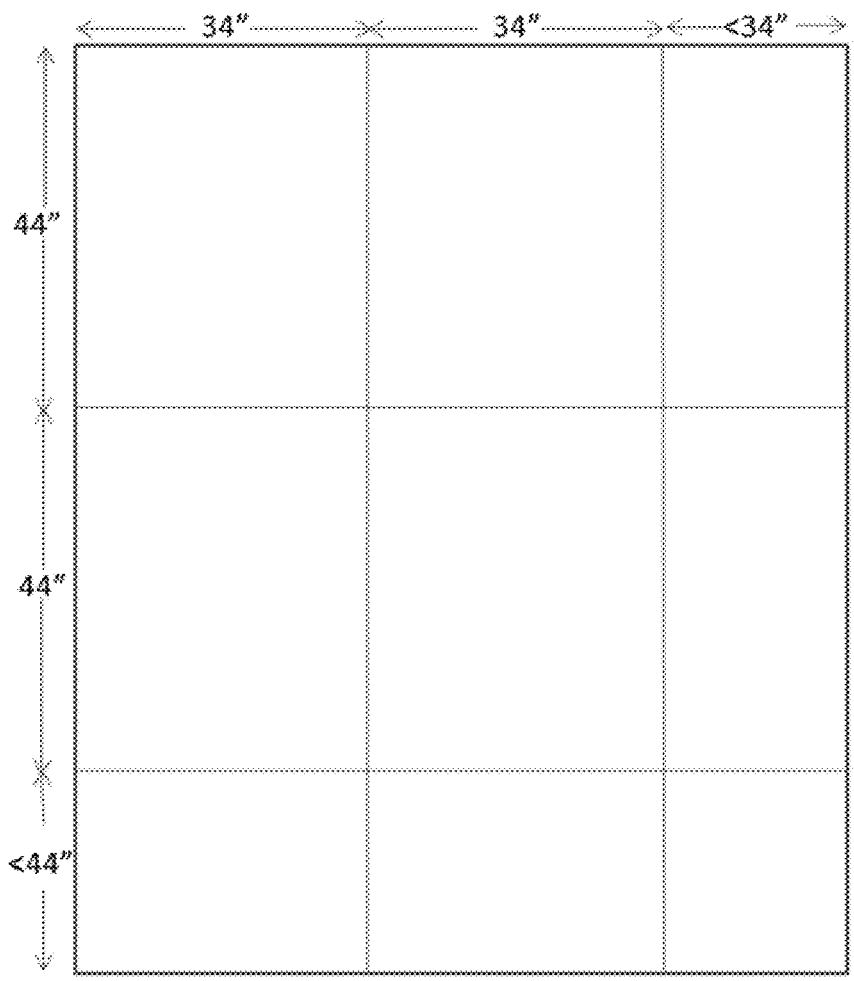
FIG. 13 shows an example of geometry information in accordance with one or more embodiments of the invention.

In one or more embodiments of the invention, as shown in FIGS. 11 and 12, when the input ED (150) has a width greater than the predetermined width (e.g., 34 inches) and a height greater than the predetermined height (e.g., 44 inches), the splitter (108) may split the input ED (150) into a plurality of pieces in both the width and height directions so that each piece has a width and a height less than or equal to the predetermined width and the predetermined height, respectively. Furthermore, as discussed above, the splitter (108) may generate geometric information among the pieces as shown in FIG. 12. In this example, the splitter (108) has split the input ED (150) into six pieces. FIG. 13 shows the geometric information representing the geometric relationships among the six pieces.

In one or more embodiments of the invention, the stitcher (110) may convert the pieces into Page parts. Each Page part includes HTML and/or SVG commands to reproduce the original content of each piece. Furthermore, the stitcher (110) may read the geometric information generated by the splitter (108) and generate a Parent part that represents the geometric relationship of the Page parts. For example, the Parent part may include HTML and/or SVG commands defining the arrangement of the Page parts when the Parent part is read and displayed in a web browser. FIG. 14 shows an example of a Parent part (second output ED (165)) that references two Page parts (first output EDs (160-1), (160-2)). In this example, the Parent part having SVG format includes a body of each Page part having SVG format. In one or more embodiments of the invention, the Parent part having HTML or SVG format may include references to all Page parts that have been stored separately.

In one or more embodiments of the invention, the generator (112) may output the Page parts as first output EDs (160), and the Parent part as the second output ED (165) to a local storage of the system (100) or a remote storage on a network. When the dimensions of the input ED are less than or equal to the predetermined dimension, the generator (112) may output the converted input ED (150) as a single output ED. Furthermore, when the scale factor is greater than or equal to the threshold value, the generator (112) may output the scaled ED converted to HTML format.

While FIG. 1 shows one particular configuration of components for illustration purposes, other configurations may be used without departing from the scope of the invention. For example, various components may be combined to form a single component. As another example, the functionality performed by a single component may be performed by two or more components.

Figure 2:
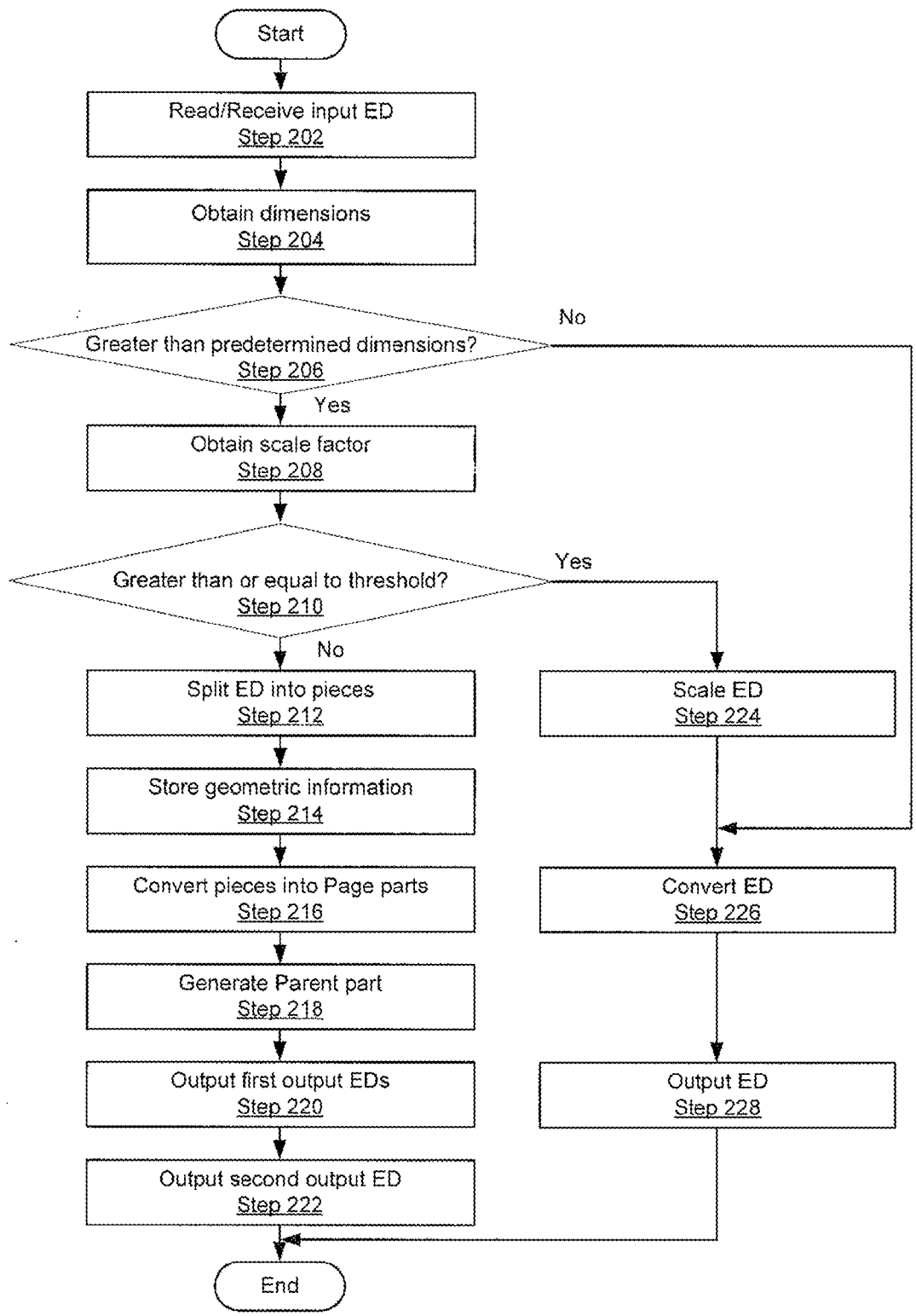
FIGS. 2 and 3 each show a flowchart in accordance with one or more embodiments of the invention.

FIG. 2 shows a flowchart in accordance with one or more embodiments of the invention. The process depicted in FIG. 2 may be used to convert an input ED (150) such as a spreadsheet from OOXML to HTML. One or more of the steps in FIG. 2 may be performed by the components of the system (100), discussed above with reference to FIG. 1. In one or more embodiments of the invention, one or more of the steps shown in FIG. 2 may be omitted, repeated, and/or performed in a different order than the order shown in FIG. 2. Accordingly, the scope of the invention is not limited to the specific arrangement of steps shown in FIG. 2.

Initially, the analyzer (106) may read or receive from another system or application the input ED (150) having OOXML format (Step 202). The read input ED (150) may be stored in the memory (104). Next, the analyzer (106) may obtain dimensions (i.e., an original width and an original height) of the input ED (150) (Step 204). After obtaining the original width and the original height of the input ED (150), the analyzer (106) may compare the original width and the original height with a predetermined width and a predetermined height, respectively (Step 206).

When the analyzer (106) determines that the dimensions of the input ED (150) are less than or equal to the predetermined dimensions (Step 206, No), the analyzer (106) may pass the input ED (150) to the stitcher (110), and the stitcher (110) may convert the input ED (150) from OOXML into HTML (Step 226). Finally, the generator (112) may output the converted ED to a storage area of the system (100) or the other system or application (Step 228).

On the other hand, when the analyzer (106) determines that the dimensions of the input ED (150) are greater than the predetermined dimensions (Step 206, Yes), the analyzer (106) may obtain a scale factor by diving the predetermined width by the original width (Step 208). Next, the analyzer (106) may compare the scale factor with a threshold value (e.g., 0.5) (Step 210).

When the analyzer (106) determines that the scale factor is greater than or equal to the threshold value (Step 210, Yes), the analyzer (106) may pass the input ED (150) and the scale factor to the stitcher (110), and the stitcher (110) may scale the input ED (150) by the scale value (Step 224). Next, the stitcher (110) may convert the scaled input ED (150) from OOXML to HTML (Step 226). Finally, the generator (112) may output the converted ED to a storage area of the system (100) or the other system or application (Step 228).

On the other hand, when the analyzer (106) determines that the scale factor is less than or equal to or equal to the threshold value (Step 210, No), the analyzer (106) may pass the input ED (150) to the splitter (108), and the splitter (108) may split the input ED (150) into a plurality of pieces so that each piece has a width and a height less than or equal to the predetermined width and the predetermined height (Step 212). When splitting the input ED (150), the splitter (108) may store geometric relationships of the pieces as geometric information (Step 214). Details of the splitting process will be discussed later with reference to FIG. 3.

After the splitting process, the splitter (108) may pass the pieces and the geometric information to the stitcher (110), and the stitcher (110) may convert the pieces to Page parts (Step 216). In addition, the stitcher (110) may generate, based on the geometric information, a Parent part that represents geometric relationships of the first output EDs (160) (Step 218). Finally, the generator (112) may output the Page parts as first output EDs (160) (Step 220), and output the Parent part as a second output ED (165) (Step 222).

In one or more embodiments of the invention, the converter (102) may receive a request for conversion from another system via a network, and execute the aforementioned conversion. Subsequently, the converter (102) may output the output EDs to the other system via the network. Thus, the converter (102) may operate as a server for converting an OOXML-based ED into HTML file(s) in the network. For example, the converter (102) may receive the request with a spreadsheet file from a client device such as a PC or a smart phone, and send converted HTML file(s) that allows the client to show the spreadsheet via a web browser.

In one or more embodiments of the invention, the predetermined width and the predetermined height may be configured based on a target device that will display the output EDs. If the target device has relatively high CPU power and relatively large memory capacity, a greater width and a greater height may be used as the predetermined width and the predetermined height. On the other hand, if the target device has a relatively low CPU power and relatively small memory capacity, a smaller width and a smaller height may be used as the predetermined width and the predetermined height.

In one or more embodiments of the invention, the converter (102) may be a program executed by a CPU or other dedicated hardware in the system (100).

Figure 3:
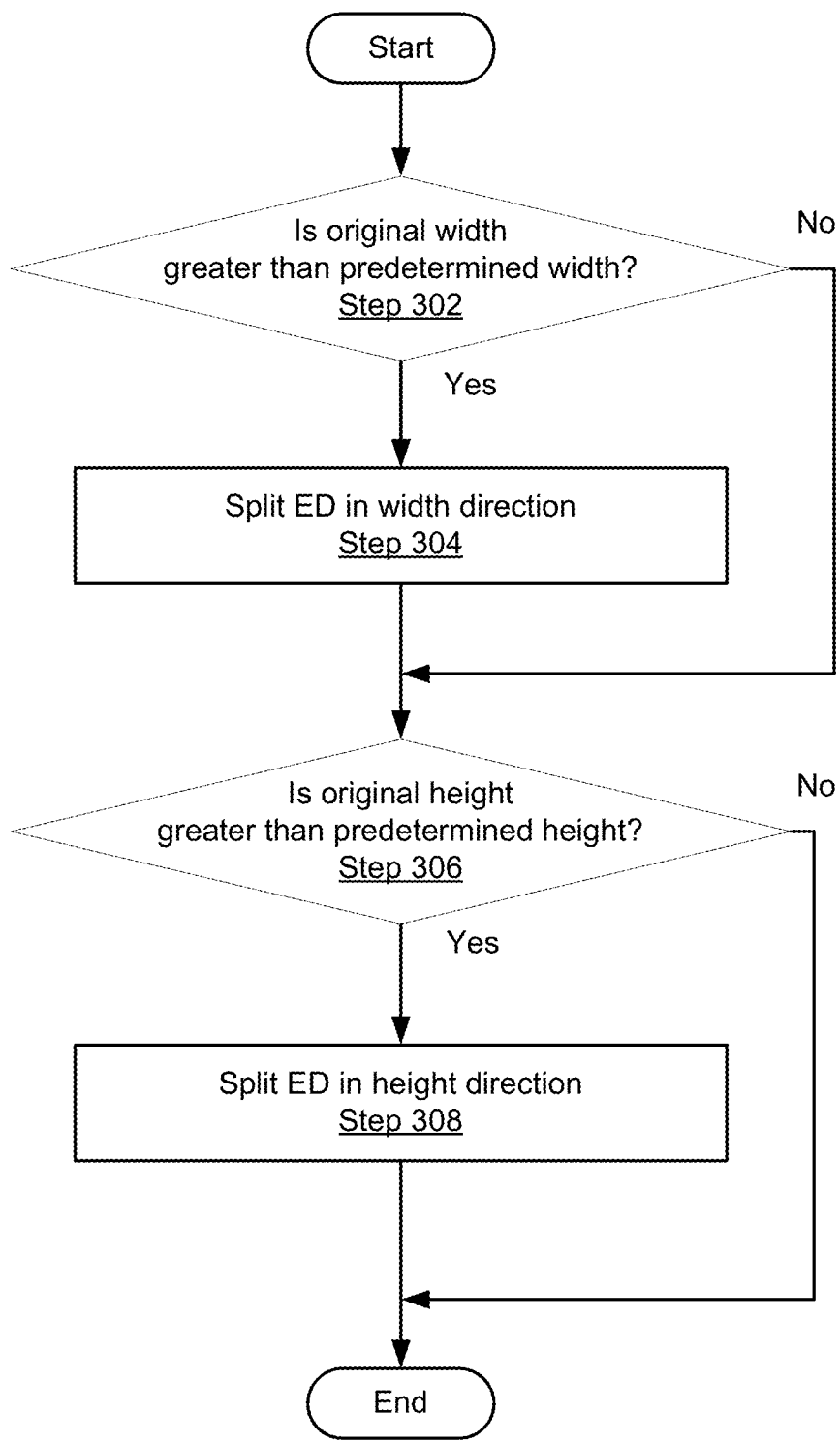

FIG. 3 shows a detailed flowchart of Step 212 in FIG. 2. The process depicted in FIG. 3 may be used to split the input ED (150) into multiple pieces in a width direction and a height direction. One or more of the steps in FIG. 3 may be performed by the components of the system (100), discussed above with reference to FIG. 1. In one or more embodiments of the invention, one or more of the steps shown in FIG. 3 may be omitted, repeated, and/or performed in a different order than the order shown in FIG. 3. Accordingly, the scope of the invention is not limited to the specific arrangement of steps shown in FIG. 3.

In accordance with one or more embodiments of the process depicted in FIG. 3, the analyzer (106) may compare the original width of the input ED (150) with the predetermined width (Step 302).

Figure 5:
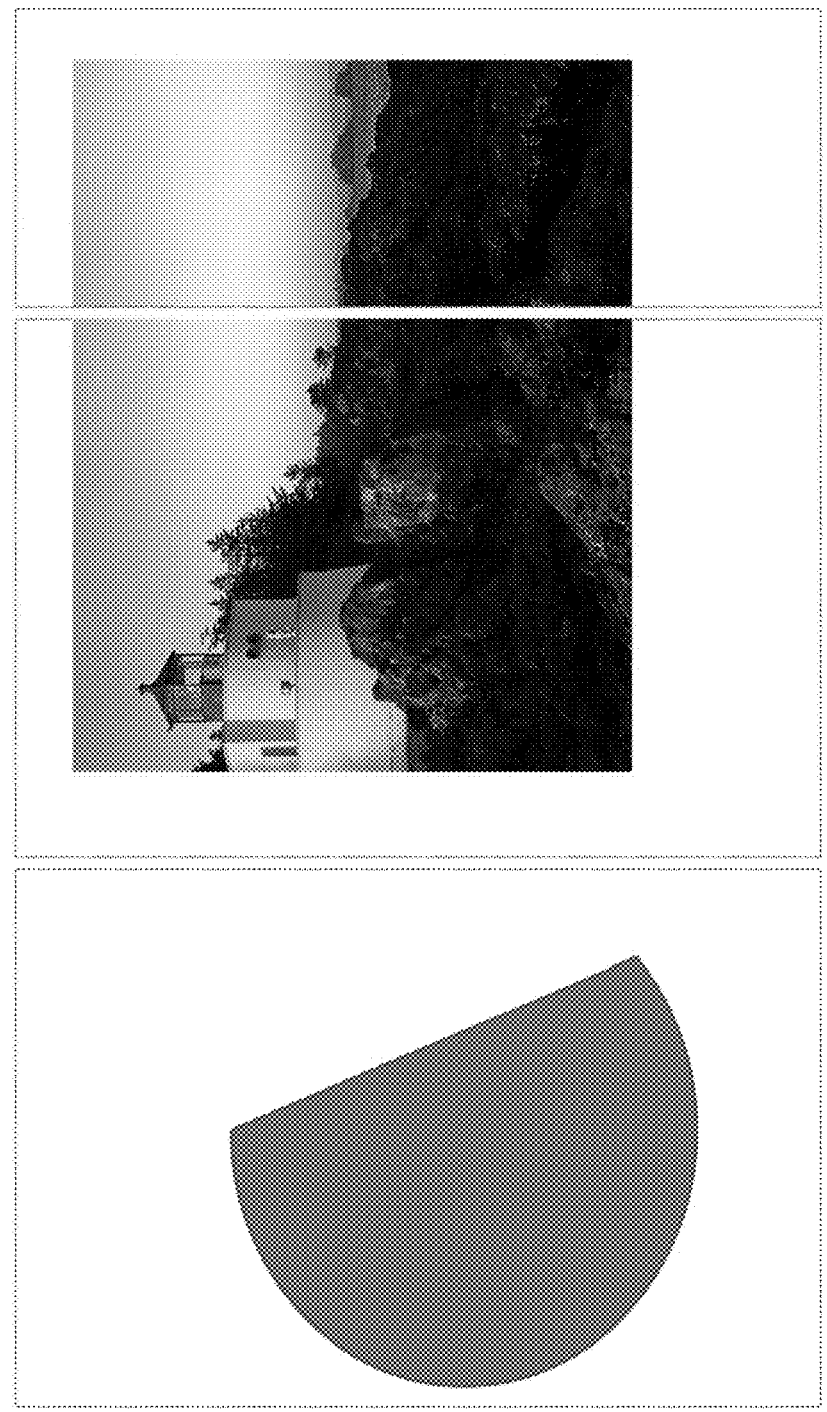

When the analyzer (106) determines that the original width is greater than the predetermined width (Step 302, Yes), the splitter (108) may split the input ED (150) into a plurality of pieces in the width direction so that each piece has a width less than or equal to the predetermined width (Step 304). FIGS. 5 and 6 show an example to split an input ED (150) into three pieces in the width direction. On the other hand, when the analyzer (106) determines that the original width is less than or equal to the predetermined width (Step 302, No), the splitter (108) may skip Step 304.

Next, the analyzer (106) may compare the height of the input ED (150) that has been split into the multiple pieces in the width direction (or the height of the input ED (150) when Step 304 has been skipped) with the predetermined height (Step 306).

When the analyzer (106) determines that height of the pieces or the input ED (150) is greater than the predetermined width (Step 306, Yes), the splitter (108) may split each piece (or the input ED (150) when Step 304 has been skipped) into a plurality of pieces in the height direction so that each piece has a height less than or equal to the predetermined height (Step 308). FIGS. 8 and 9 show an example where an input ED (150) has been split into three pieces in the height direction in accordance with one or more embodiments of the invention, and FIGS. 11 and 12 show an example where an input ED (150) has been split into three pieces in the width direction as well as three pieces in the height direction in accordance with one or more embodiments of the invention. On the other hand, when the analyzer (106) determines that the height is less than or equal to the predetermined width (Step 306, No), the splitter (108) may skip Step 308.

In one or more embodiments of the invention, the splitter (108) may compare the original width and the original height with the predetermined width and the predetermined height, respectively, and make the determinations in Steps 302 and 306.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output devices to perform one or more embodiments of the invention.

Figure 15:
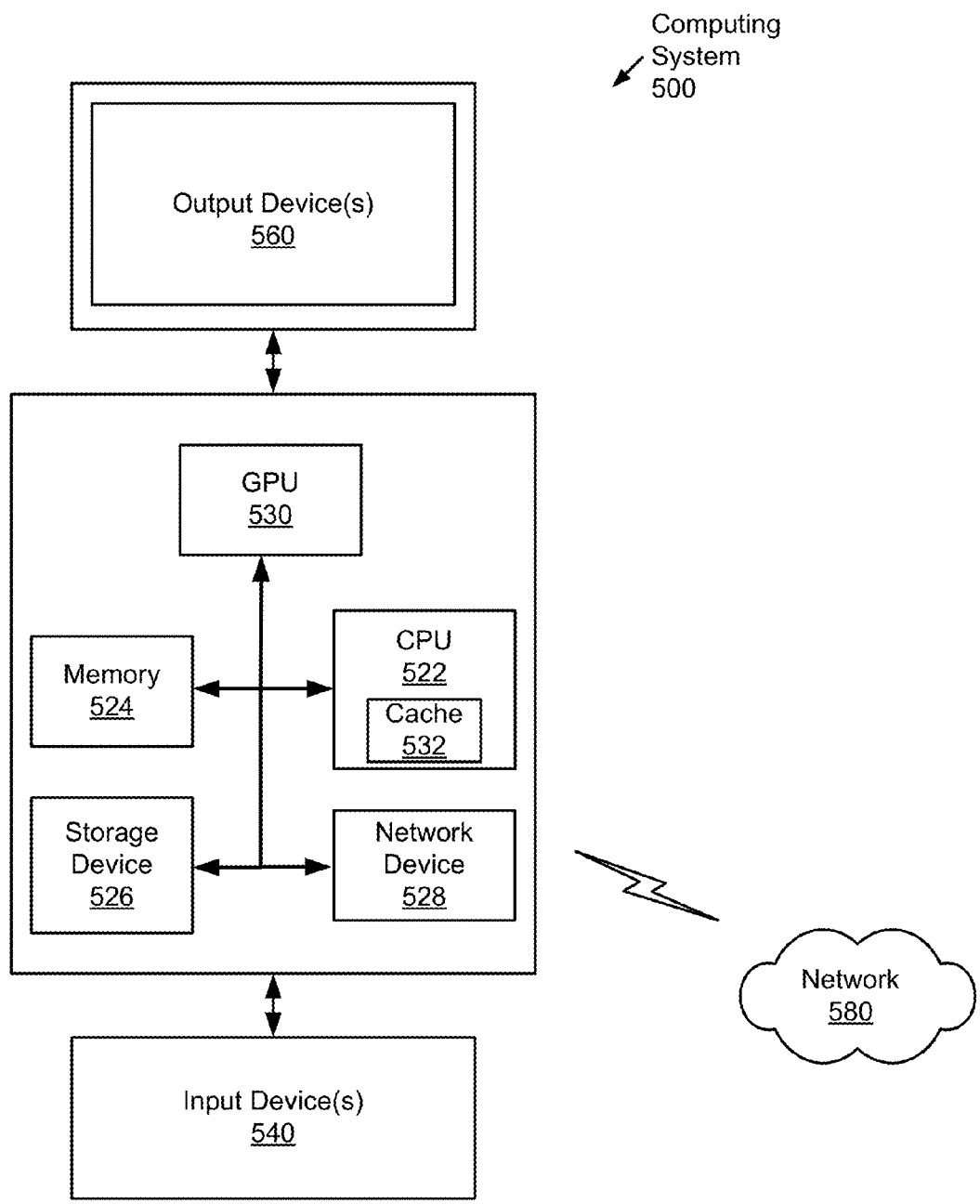
FIG. 15 shows a computer system in accordance with one or more embodiments of the invention.

For example, as shown in FIG. 15, the computing system (500) may include one or more CPUs (522) each having one or more caches (532), associated memory (524) (e.g., random access memory (RAM), cache memory, flash memory, etc.), one or more storage devices (526) (e.g., a hard disk, an optical drive such as a compact disk (CD) drive or digital versatile disk (DVD) drive, a flash memory stick, etc.), a network device (528) (e.g., a network interface card, a wireless LAN module, a wide area network module, a Bluetooth module, a ZigBee module, an infra-red communication module, etc.), one or more GPUs (530), and numerous other elements and functionalities.

The CPU (522) may be an integrated circuit for processing instructions. For example, the computer processor may be one or more cores or micro-cores of a processor. The CPU (522) may have one or more caches (532) which are faster memories than the (main) memory (524). The computing system (500) may also include one or more input devices (540), such as a touchscreen, keyboard, mouse, microphone, touchpad, electronic pen, or any other type of input device. Further, the computing system (500) may include one or more output devices (560), such as a screen (e.g., a liquid crystal display (LCD), plasma display, touchscreen, cathode ray tube (CRT) monitor, projector, or other display device), a printer or a plotter, external storage, or any other output device. One or more of the output devices may be the same or different from the input devices. The computing system (500) may also include a network device (528) connected to a network (580) (e.g., a local area network (LAN), a wide area network (WAN) such as the Internet, mobile network, or any other type of network) via a network interface connection (not shown). The input and output devices may be locally or remotely (e.g., via the network (580)) connected to the CPU (522), memory (524), storage device (526), network device (528), and GPU (530). Many different types of computing systems exist, and the aforementioned input and output devices may take other forms.

Software instructions in the form of computer readable program code to perform embodiments of the invention may be stored, in whole or in part, temporarily or permanently, on a non-transitory computer readable medium such as a CD, DVD, Blu-ray Disc, storage device, a diskette, a tape, flash memory, physical memory, or any other computer readable storage medium. Specifically, the software instructions may correspond to computer readable program code that, when executed by a processor, is configured to perform embodiments of the invention.

Further, one or more elements of the aforementioned computing system (500) may be located at a remote location and connected to the other elements over a network (580). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for converting an electronic document (ED) having a first file format, comprising:
    calculating an original width of the ED and an original length of the ED from a markup of the ED, wherein the markup of the ED specifies a graphic using a tag;
    comparing the original width of the ED with a predetermined width and the original length of the ED with a predetermined length;
    determining that the original width is greater than the predetermined width, and obtain a first scale factor by dividing the predetermined width by the original width;
    determining whether to scale the ED or split the ED based on the first scale factor and a threshold value;
    determining that the first scale factor is less than the threshold value, and splitting the ED, wherein splitting the ED comprises:
        splitting the ED into the plurality of pieces in a width direction when the original width is greater than the predetermined width, and splitting the ED into a plurality of pieces in a length direction when the original length is greater than the predetermined length, wherein each of the pieces has a width and a length less than or equal to the predetermined width and the predetermined length, respectively, wherein splitting the ED comprises splitting the graphic across at least two of the plurality of pieces;
        storing geometric information representing geometric relationships of the plurality of pieces;
        converting the plurality of pieces from the first file format into a second file format described by a markup language comprising tags;
        outputting the converted pieces having the second file format as first output EDs;
        outputting a second output ED having the second file format, wherein the second output ED incorporated the first output EDs in accordance with the geometric information when the second output ED is displayed by a viewer application; and
    determining that the first scale factor is greater than or equal to the threshold value, and scaling the ED, wherein scaling the ED comprises:
        scaling the ED by the first scale factor;
        converting the scaled ED from the first file format into the second file format; and
        outputting the scaled ED having the second file format.

2. The method of claim 1, further comprising:
    obtaining a second scale factor by dividing the predetermined length by the original length; and
    when the second scale factor is greater than or equal to a threshold value:
        scaling the ED by the second scale factor instead of splitting the ED into the plurality of pieces,
        converting the scaled ED from the first file format into the second file format, and
        outputting the scaled ED having the second file format.

3. The method of claim 1, wherein
the first file format is OOXML, and the second file format is HTML.

4. A conversion system for converting an electronic document (ED) having a first file format, comprising:
    a memory that stores the ED; and
    a processor that:
        calculates an original width of the ED and an original length of the ED from a markup of the ED, wherein the markup of the ED specifies a graphic using a tag;
        compares the original width of the ED with a predetermined width and the original length of the ED with a predetermined length;
        determines that the original width is greater than the predetermined width, and obtain a first scale factor by dividing the predetermined width by the original width;

determines whether to scale the ED or split the ED based on the first scale factor and a threshold value;

determines that the first scale factor is less than the threshold value, and splitting the ED, wherein splitting the ED comprises:

splits the ED into the plurality of pieces in a width direction when the original width is greater than the predetermined width, and splitting the ED into a plurality of pieces in a length direction when the original length is greater than the predetermined length, wherein each of the pieces has a width and a length less than or equal to the predetermined width and the predetermined length, respectively, wherein splitting the ED comprises splitting the graphic across at least two of the plurality of pieces;

stores geometric information representing geometric relationships of the plurality of pieces;

converts the plurality of pieces from the first file format into a second file format described by a markup language comprising tags;

outputs the converted pieces having the second file format as first output EDs;

outputs a second output ED having the second file format, wherein the second output ED incorporated the first output EDs in accordance with the geometric information when the second output ED is displayed by a viewer application; and determine that the first scale factor is greater than or equal to the threshold value, and scaling the ED, wherein scaling the ED comprises:

scales the ED by the first scale factor;

converts the scaled ED from the first file format into the second file format; and outputs the scaled ED having the second file format.

5. The conversion system of claim 4, wherein
the processor obtains a second scale factor by dividing the predetermined length by the original length, and
when the second scale factor is greater than or equal to a threshold value, the processor:
scales the ED by the second scale factor instead of splitting the ED into the plurality of pieces,
converts the scaled ED from the first file format into the second file format, and
outputs the scaled ED having the second file format.

6. The conversion system of claim 4, wherein
the first file format is OOXML, and the second file format is HTML.

7. A non-transitory computer readable medium (CRM) storing instructions for converting an electronic document (ED) having a first file format, the instructions comprising functionality for:

calculating an original width of the ED and an original length of the ED from a markup of the ED, wherein the markup of the ED specifies a graphic using a tag;

comparing the original width of the ED with a predetermined width and the original length of the ED with a predetermined length;

determining that the original width is greater than the predetermined width, and obtain a first scale factor by dividing the predetermined width by the original width;

determining whether to scale the ED or split the ED based on the first scale factor and a threshold value;

determining that the first scale factor is less than the threshold value, and splitting the ED, wherein splitting the ED comprises:

splitting the ED into the plurality of pieces in a width direction when the original width is greater than the predetermined width, and splitting the ED into a plurality of pieces in a length direction when the original length is greater than the predetermined length, wherein each of the pieces has a width and a length less than or equal to the predetermined width and the predetermined length, respectively, wherein splitting the ED comprises splitting the graphic across at least two of the plurality of pieces;

storing geometric information representing geometric relationships of the plurality of pieces;

converting the plurality of pieces from the first file format into a second file format described by a markup language comprising tags;

outputting the converted pieces having the second file format as first output EDs;

outputting a second output ED having the second file format, wherein the second output ED incorporated the first output EDs in accordance with the geometric information when the second output ED is displayed by a viewer application; and determining that the first scale factor is greater than or equal to the threshold value, and scaling the ED, wherein scaling the ED comprises:

scaling the ED by the first scale factor;

converting the scaled ED from the first file format into the second file format; and outputting the scaled ED having the second file format.

8. The CRM of claim 7, wherein the instructions further comprise functionality for:

obtaining a second scale factor by dividing the predetermined length by the original length; and when the second scale factor is greater than or equal to a threshold value:
scaling the ED by the second scale factor instead of splitting the ED into the plurality of pieces,
converting the scaled ED from the first file format into the second file format, and
outputting the scaled ED having the second file format.

9. The CRM of claim 7, wherein
the first file format is OOXML, and the second file format is HTML.

* * * * *